United States Patent
Wolk

(10) Patent No.: US 11,821,389 B2
(45) Date of Patent: Nov. 21, 2023

(54) METHOD AND SYSTEM FOR SUPPLYING FUEL GAS

(71) Applicant: Caterpillar Inc., Peoria, IL (US)

(72) Inventor: Matthew T. Wolk, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 145 days.

(21) Appl. No.: 17/408,154

(22) Filed: Aug. 20, 2021

(65) Prior Publication Data

US 2023/0054901 A1 Feb. 23, 2023

(51) Int. Cl.
*F02M 21/02* (2006.01)
*F02M 21/04* (2006.01)

(52) U.S. Cl.
CPC .... *F02M 21/0239* (2013.01); *F02M 21/0215* (2013.01); *F02M 21/0221* (2013.01); *F02M 21/0233* (2013.01); *F02M 21/047* (2013.01)

(58) Field of Classification Search
CPC .......... F02M 21/0239; F02M 21/0215; F02M 21/0221; F02M 21/0233; F02M 21/047
See application file for complete search history.

(56) References Cited

U.S. PATENT DOCUMENTS

| | | | |
|---|---|---|---|
| 4,476,827 A | 10/1984 | Basaglia et al. | |
| 4,895,125 A * | 1/1990 | Geiger | F02D 9/1055 123/568.11 |
| 6,609,373 B2 | 8/2003 | Coleman et al. | |
| 7,685,819 B2 | 3/2010 | Vetrovec | |
| 8,287,233 B2 | 10/2012 | Chen | |
| 9,239,034 B2 | 1/2016 | Cunningham et al. | |
| 2010/0300413 A1* | 12/2010 | Ulrey | F02M 35/10222 123/518 |
| 2012/0073287 A1 | 3/2012 | Kang et al. | |
| 2016/0153371 A1 | 6/2016 | Ge | |

FOREIGN PATENT DOCUMENTS

| | | |
|---|---|---|
| EP | 0309044 | 3/1989 |
| EP | 0732490 B1 | 4/2001 |
| EP | 1319896 A2 | 6/2003 |
| EP | 1213467 A2 | 3/2006 |
| JP | S5929756 | 2/1984 |
| JP | S6142103 * | 9/1986 |
| JP | S6338543 * | 8/1988 |
| WO | 9816747 A1 | 4/1998 |
| WO | 2021142229 A1 | 7/2021 |

OTHER PUBLICATIONS

European Examination Search Report for Patent Appln. No. 22186812.8, dated Jan. 2, 2023 (80 pgs).

* cited by examiner

*Primary Examiner* — Syed O Hasan
(74) *Attorney, Agent, or Firm* — Bookoff McAndrews, PLLC

(57) ABSTRACT

A system for introducing a gaseous fuel to an internal combustion engine includes a fuel storage device, a compressor, and an air and fuel conduit in fluid communication with the fuel storage device and with the compressor. The air and fuel conduit includes a first passage and a second passage that includes a first portion and a second portion, the second portion being a venturi portion, the second passage being fluidly connected to the compressor in parallel with the first passage.

19 Claims, 3 Drawing Sheets

METHOD AND SYSTEM FOR SUPPLYING FUEL GAS

TECHNICAL FIELD

The present disclosure relates generally to internal combustion engines, and more particularly, to methods and systems for fuel supply in internal combustion engines.

BACKGROUND

Internal combustion engines are employed in many applications including, for example, vehicles, mobile machines, and stationary machines such as power generation systems. While most conventional engines are designed for use with gasoline and diesel fuels, recent engine systems are suitable for combustion of alternative fuels including gaseous fuels. Gaseous fuels, such as natural gas, offer advantages such as abundance, efficiency, and cleanliness when compared to conventional fuels for internal combustion engines.

When used in an internal combustion engine, gaseous fuel can be mixed with intake air, for example in a delivery system, before the fuel is delivered to the engine for combustion. Some engine systems introduce gaseous fuel via fumigation, in which fuel gas is drawn into this delivery system to supply the gaseous fuel, together with air, to the engine. Devices for supplying gaseous fuel can include venturi sections or carburetor sections that reduce the pressure of air at the location where the gaseous fuel is introduced. While venturi sections are effective in reducing the pressure at specific locations to facilitate the supply of fuel gas under some operating conditions, they may introduce undesired performance at high air flow rates, for example. In particular, venturi sections may introduce excessive pressure loss at high-flow conditions, such as when the engine is operating at a relatively high load.

An exemplary gas regulator and method for a multi-fuel engine is disclosed in U.S. Patent Application Publication No. 2016/0153371 A1 ("the '371 publication") to Xinyu Ge. The gas regulator described in the '371 application regulates pressure of fuel supplied from a fuel source to a carburetor. While the gas regulator and method described in the '371 publication may supply fuel appropriately under various conditions, it may be beneficial to include an air and fuel supply passage having a plurality of individual paths to improve the supply of air and fuel to an internal combustion engine.

The disclosed methods and systems may solve one or more of the problems set forth above and/or other problems in the art. The scope of the current disclosure, however, is defined by the claims, and not by the ability to solve any specific problem.

SUMMARY

In one aspect, a system for introducing a gaseous fuel to an internal combustion engine may include a fuel storage device, a compressor, and an air and fuel conduit in fluid communication with the fuel storage device and with the compressor. The air and fuel conduit may include a first passage and a second passage that includes a first portion and a second portion, the second portion being a venturi portion, the second passage being fluidly connected to the compressor in parallel with the first passage.

In another aspect, a fuel system may include a fuel storage device and a first passage. The first passage may include a first air inlet configured to receive intake air, a first fuel inlet in fluid communication with the fuel storage device and configured to receive gaseous fuel downstream of the first air inlet, and a valve configured to open and close the first passage. The system may also include a second passage connected in parallel with the first passage, the second passage including a second air inlet configured to receive intake air and a second fuel inlet configured to receive gaseous fuel downstream of the second air inlet.

In yet another aspect, a method for supplying fuel and air to an internal combustion engine may include controlling a flow of intake air and fuel through a first passage of an air and fuel conduit and receiving intake air and fuel with a second passage of the air and fuel conduit, the second passage being connected in parallel with the first passage. The method may also include opening in the first passage to permit a flow of the intake air and fuel and supplying the intake air and fuel from the first passage and from the second passage to the internal combustion engine.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

Both the foregoing general description and the following detailed description are exemplary and explanatory only and are not restrictive of the features, as claimed. As used herein, the terms "comprises," "comprising," "having," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. Moreover, in this disclosure, relative terms, such as, for example, "about," "substantially," "generally," and "approximately" are used to indicate a possible variation of ±10% in the stated value.

Figure 1:
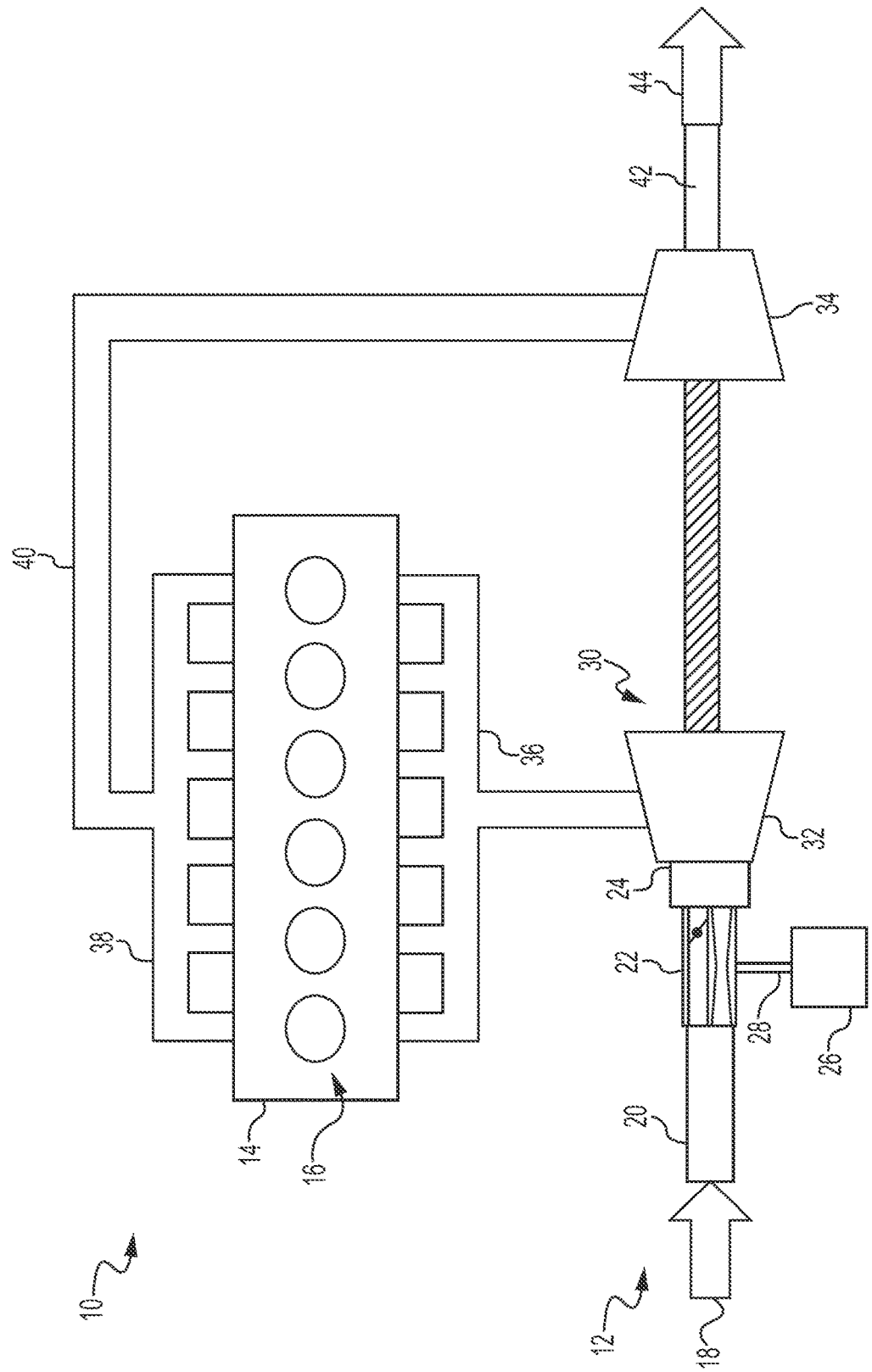
FIG. 1 is a diagram of an internal combustion engine system including an air and fuel conduit, according to aspects of the present disclosure.

FIG. 1 illustrates an exemplary internal combustion engine system 10 according to aspects of the present disclosure. Internal combustion engine system 10 may include an air and fuel supply system 12 and an internal combustion engine 14 which receives air and gaseous fuel introduced with supply system 12. Engine 14 may include a plurality of cylinders 16 for the combustion of fuel. Engine 14 may be configured to combust gaseous fuel, either alone (e.g., via spark-ignition initiated with a spark plug) or together with liquid fuel, such as diesel (e.g., by compression-ignition of liquid fuel to initiate combustion). The gaseous fuel may include natural gas (e.g., a mixture of methane and one or more of ethane, butane, and propane), propane gas, methane gas, a biogas, a mixture thereof, or any other suitable fuel that can be supplied to intake manifold 36 and cylinders 16 in gaseous form.

Air and fuel supply system 12 may include components that connect an air inlet 18 with an intake manifold 36 to supply air, together with fuel from a fuel storage device such as fuel source 26, to cylinders 16. Air and fuel supply system 12 may include clean air inlet 18, a low pressure inlet air passage 20, an air and fuel conduit 22, a mixing passage or connection passage 24, a turbocharger 30, and an intake manifold 36. Air and fuel supply system 12 may also include components for the storage and supply of gaseous fuel. For example, air and fuel supply system 12 may include the fuel source 26 and one or more fuel supply lines 28. Fuel source 26 may include one or more storage devices, such as fuel storage tanks, configured to store natural gas or another gaseous fuel. As used herein, "gaseous fuel" may include, in addition to fuel stored in gaseous form in fuel source 26, fuel stored in a liquid form in fuel source 26 and supplied, in gaseous form, via air and fuel supply system 12.

Air inlet 18 may allow clean intake air to enter air and fuel supply system 12 and may include one or more air filters, for example. Low pressure inlet air passage 20 may be connected to air inlet 18 upstream of a compressor 32 of turbocharger 30. An air and fuel conduit 22, also referred to herein as conduit 22, may be connected between air inlet 18 and compressor 32. Conduit 22 may include an inlet end connected to inlet air passage 20 and an outlet end connected to a connection passage 24. Conduit 22 may further include fuel inlet openings that are connected to a fuel source 26 via one or more fuel supply lines 28, as described below. The outlet end of conduit 22 may be connected to a compressor 32 of turbocharger 30 via connection passage 24. However, the outlet end of conduit 22 may be directly connected to an inlet of compressor 32, instead of being connected to compressor 32 via connection passage 24, if desired. While turbocharger 30 is shown in FIG. 1 with both a compressor 32 and a turbine 34, system 10 may include only a compressor 32 without turbine 34, such as a compressor 32 driven by a crankshaft of engine 14.

An outlet of compressor 32 may be connected to cylinders 16 of engine 14 via an intake manifold 36. Downstream of cylinders 16, an exhaust manifold 38 may be connected to an inlet of turbine 34 by a high pressure exhaust passage 40. An outlet of turbine 34 may be connected to a low pressure exhaust passage 42. Low pressure exhaust passage 42 may include one or more aftertreatment systems, such as catalysts, filters, etc. (not shown). Exhaust may exit system 10 through an exhaust outlet 44 downstream of passage 42 after passing through any aftertreatment systems of system 10.

Figure 2:
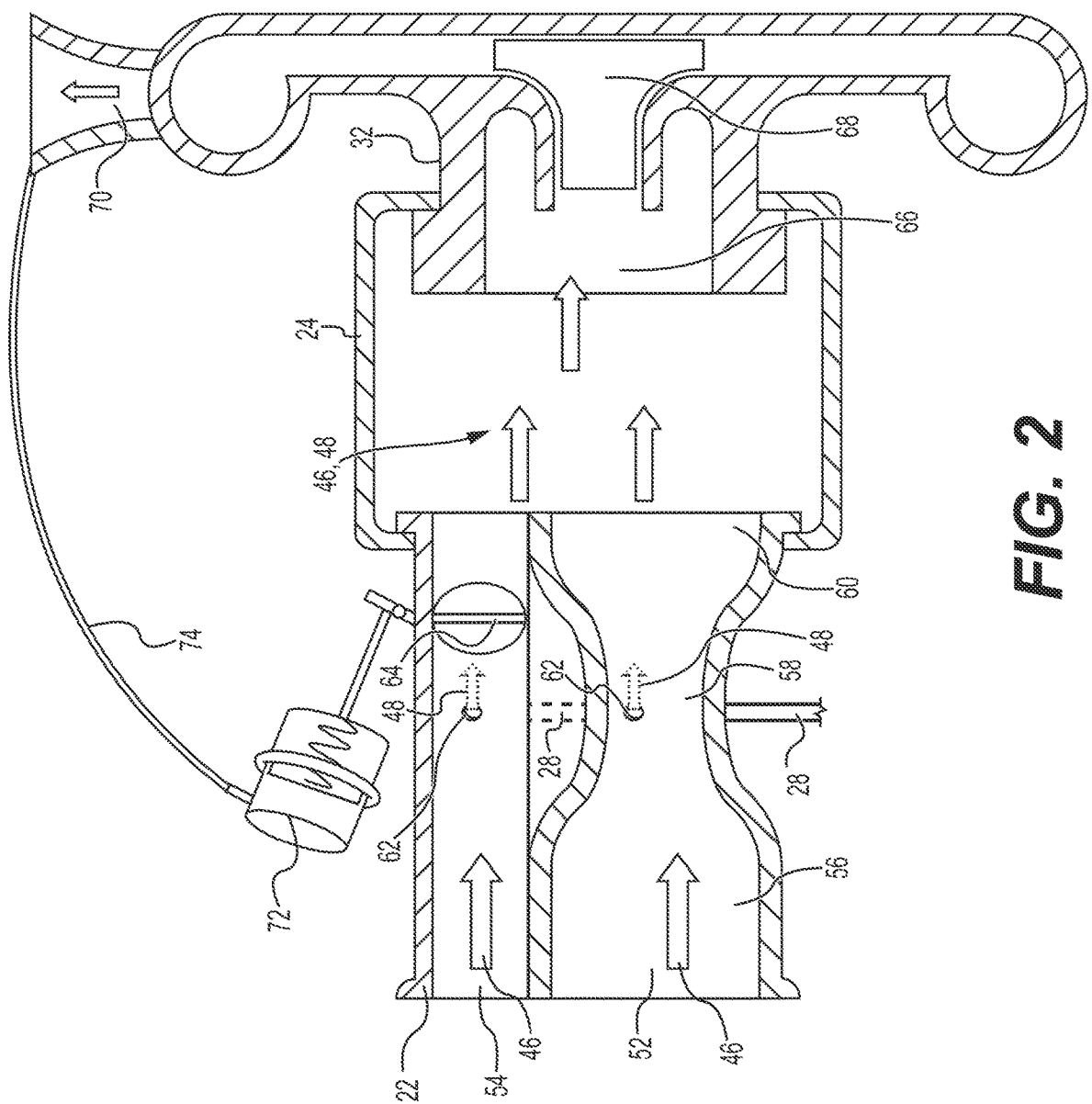
FIG. 2 is a cross-sectional view of components of the internal combustion engine system shown in FIG. 1, including an exemplary air and fuel conduit.

FIG. 2 is a cross-sectional view of conduit 22, connection passage 24, and compressor 32, according to an exemplary configuration of system 10. As shown in FIG. 2, conduit 22 may include a plurality of parallel passages. As used herein passages that are "parallel" to each other provide separate or divided paths for air and/or fuel. For example, conduit 22 may include a permanently-open venturi passage 52 configured to receive air 46 and fuel 48, and a selectively-opened bypass passage 54. Bypass passage 54 may be configured to receive air 46 at an inlet opening at the upstream end of passage 54, and configured to receive fuel 48 at fuel inlet opening 63, passage 54 being connected parallel to passage 52. Connection passage 24 may provide a bridge for air 46 and fuel 48 to mix and flow from conduit 22 to an inlet 66 of compressor 32. Compressor 32 may include compressor inlet 66, a compressor wheel 68, and an outlet 70.

Venturi passage 52 of conduit 22 may have an approximately hourglass-shaped internal geometry that receives air at an inlet end and guides this air to an outlet end at connection passage 24 or at inlet 66. Venturi passage 52 may include a first widened portion 56 having an approximately constant diameter, widened portion 56 extending from an inlet end of venturi passage 52. This inlet end of widened portion 56 may receive intake air 46. A venturi portion or narrowed portion 58 may extend downstream of widened portion 56. One or more fuel inlet openings 62 may be positioned within narrowed portion 58. In an exemplary configuration, fuel inlet opening 62 may be formed in a wall of narrowed portion 58 at a narrowest diameter of the entire venturi passage 52. A second widened portion 60 may extend downstream from narrowed portion 58 to the outlet end of conduit 22. While portion 58 as well as passage 52 as a whole are each shown having asymmetrical shapes when upstream and downstream portions are compared to each other, passage 52 may instead be formed with an internal shape where narrowed portion 58 and/or an entirety of passage 52 is symmetrical, having a plane of symmetric that extends orthogonal to the flow path of air.

Bypass passage 54 may extend from the inlet end of conduit 22 to the outlet end of conduit 22. In the exemplary configuration shown in FIG. 2, bypass passage 54 has a substantially constant diameter through the entire length of passage 54, including an air inlet formed at the inlet end of conduit 22. Bypass passage 54 may also include one or more fuel inlet openings 62, like venturi passage 52. Bypass passage 54 may house a bypass passage valve 64 configured to be opened and closed to respectively permit and prohibit a flow of air 46 and gaseous fuel 48. Valve 64 may be opened and closed by an actuator 72. In an exemplary configuration, bypass valve 64 may be positioned downstream of the inlet of passage 54 and of fuel inlet opening 62. Bypass valve 64 may include a valve member, such as a butterfly valve member, that is configured to gradually open to control an amount of restriction to flow through passage 54. Thus, actuator 72 may actuate bypass valve 64 between a plurality of positions between a fully closed position, in which no flow of either air or fuel is permitted through bypass passage 54, and a fully opened position in which flow of both air and gaseous fuel is fully unrestricted through passage 54.

Bypass valve 64 may be a pneumatically-actuated valve that is activated by actuator 72 at a predetermined threshold pressure. For example, bypass valve 64 may begin to open at a predetermined opening pressure, and may gradually open until reaching a predetermined maximum pressure at which valve 64 is fully opened. The predetermined opening pressure and predetermined maximum pressure may correspond to different pressures of gas that has been compressed with compressor wheel 68 of compressor 32 and output from compressor 32. In particular, these pressures may correspond to a pressure of gas output from compressor 32 via compressor outlet 70. To facilitate the actuation of actuator 72 according to the pressure of gas output from compressor 32, pressure line 74 may be in fluid communication with actuator 72 and with compressor outlet 70. The pressure of gas within line 74, which corresponds to the pressure of gas of compressor outlet 70, may act against a spring of actuator 72 that biases valve 64 to a closed position. In this example, the pressure of gas corresponding to the predetermined opening pressure may be the minimum pressure sufficient to overcome the biasing force of this spring.

While valve 64 may be configured to gradually open between a predetermined opening pressure and a predetermined maximum pressure so as to provide varying amounts of restriction through bypass passage 54, valve 64 and actuator 72 may instead be configured to fully open valve 64 immediately when the pressure of gas output from compressor 32 reaches the predetermined opening pressure, for example by selecting an appropriate spring member for actuator 72. As another example where actuator 72 is electrically actuated, a controller for controlling the position of valve 64 may cause actuator 72 to fully open valve 64 when the pressure of gas in compressor outlet 70 reaches the predetermined opening pressure. Electrically-actuated configurations of valve 64 may also enable gradual opening of valve 64 between the predetermined opening pressure and the predetermined maximum pressure.

While one fuel inlet opening 62 is shown for passage 52 and another fuel inlet opening 62 is shown for passage 54, a plurality of fuel inlet openings 62 may be formed within venturi passage 52, bypass passage 54, or both. When a plurality of fuel inlet openings 62 are provided, these passages may be circumferentially spaced apart from each other, longitudinally spaced apart from each other, or both.

Industrial Applicability

The disclosed aspects of system 10 may be employed in a variety of internal combustion engines that are configured to combust gaseous fuel, either alone or together with another fuel source, such as a liquid fuel (e.g., diesel). Exemplary applications for system 10, including engine 14, may include power generation systems, machines (e.g., dozers, excavators, loaders, pipelaying machines, grading machines, etc.), vehicles, and others. System 10 may be applied, for example, in engine systems that are configured for combustion of gaseous fuel and air, and in particular, engine systems including a compressor that compress gaseous fuel and air before supplying mixed fuel and air to the cylinders of the engine.

During the operation of system 10, engine 14 combusts gaseous fuel and air supplied to cylinders 16 to generate power. As shown in FIG. 1, gaseous fuel and air may be supplied to engine 14 by air and fuel supply system 12. Clean air from outside system 10 may enter air and fuel supply system 12 via air inlet 18. This air may be guided to an inlet end of conduit 22 by low pressure inlet air passage 20. Fuel may also enter at least one passage of conduit 22 from fuel source 26 and one or more fuel supply lines 28. The air and fuel may mix together before the fuel and air are supplied to compressor 32. Compressor 32 may receive air and gaseous fuel from conduit 22, compress this air and fuel via compressor wheel 68 (FIG. 2), and supply the compressed air and fuel, via compressor outlet 70, to intake manifold 36. The mixed air and fuel may be received within cylinders 16 (e.g., via one or more respective intake valves of each cylinder 16, not shown) and combusted. The exhaust produced by this combustion may be supplied to exhaust manifold 38 (e.g., via one or more respective exhaust valves of each cylinder 16, not shown). Exhaust may then be supplied to high pressure exhaust passage 40, enter an inlet of turbine 34, and exit system 10 via low pressure exhaust passage 42 and exhaust outlet 44.

Figure 3:
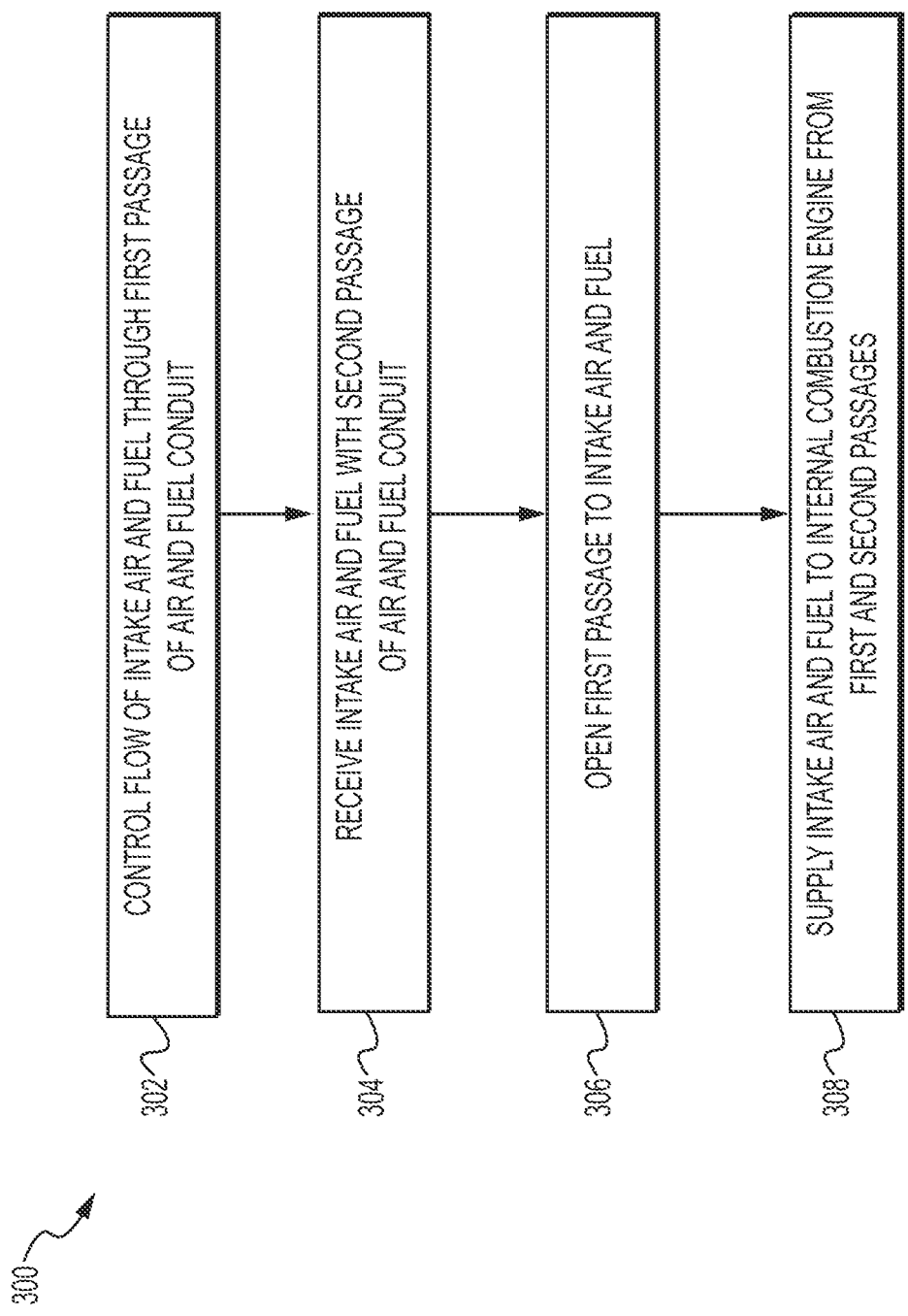
FIG. 3 is a flowchart of an exemplary process for supplying fuel and air to an internal combustion engine, according to aspects of the present disclosure.

FIG. 3 is a flowchart illustrating an exemplary method 300 for supplying fuel and air to an internal combustion engine, according to aspects of the present disclosure. Method 300 may include receiving air and gaseous fuel, such as natural gas, with a plurality of parallel passages (e.g., first and second passages) before the air and fuel are supplied to internal combustion engine 14. These passages, which may include venturi passage 52 and bypass passage 54, may be connected in parallel and configured to allow the flow of air and fuel to engine 14 to change depending on the intake air and fuel requirements of engine 14. For example, venturi passage 52 may be configured as a low-pressure passage that supplies air and fuel to engine 14 when the flow of air through passage 52 is relatively low (e.g., during a low-load condition of engine 14). During this low-load operation of engine 14, the constriction formed within narrowed portion 58 may cause air 46 to draw fuel 48 out from fuel inlet opening 62 of passage 52. Bypass passage 54 may be configured as a high-pressure passage that is closed (e.g., by valve 64) when engine 14 is in a low-load condition, and open when engine 14 is in a high-load condition.

In a step 302, a flow of intake air and fuel may be controlled within air and fuel supply system 12 (FIG. 1), and in particular, within bypass passage 54. The flow of this air and fuel may be controlled with, for example, valve 64 within bypass passage 54. For example, when the pressure of gas (e.g., air and fuel) output from compressor outlet 70 of compressor 32 is below a predetermined opening pressure, which may be a minimum desired pressure to begin opening valve 64, valve 64 may fully close bypass passage 54. When in the fully closed position, valve 64 may prohibit the flow of received intake air 46 through bypass passage 54, allowing an entirety of air 46 received by conduit 22 to pass through narrowed portion 58 to draw a desired quantity of fuel from opening 62, facilitating low-load operation of engine 14.

In a step 304, intake air 46 and gaseous fuel 48 may be received by venturi passage 52, via fuel inlet openings 62, to draw air 46 and fuel 48 into cylinders 16 of engine 14. As indicated above, when the pressure at compressor outlet 70 is below the predetermined opening pressure, valve 64 may fully close bypass passage 54, blocking the flow of fuel 48, in addition to the flow of air 46, through bypass passage 54. Thus, during step 304, passage of air 46 and fuel 48 through passage 54 may be blocked such that an entirety of the air 46 and fuel 48 received by engine 14 is supplied via venturi passage 52, as valve 64 prevents air 46 from flowing through passage 54 to draw fuel 48 through the fuel inlet openings 62 in passage 54. Thus, during relatively low-load and/or low-speed operation of engine 14, a desired quantity of gaseous fuel may be supplied to engine 14 by venturi passage 52.

A step 306 may be performed when the pressure of gas output with compressor outlet 70 reaches or exceeds the predetermined opening pressure following a period of time when the pressure of gas from outlet 70 was below this predetermined opening pressure. In response to a change in pressure in outlet 70, which may be associated with an increase in the load of engine 14 as an example, valve 64 of conduit 22 may open, permitting a flow of intake air and fuel received by bypass passage 54 to engine 14. This may facilitate supply of air 46 and fuel 48 to compressor 24 at a higher pressure as compared to the supply of air 46 and fuel 48 when valve 64 is closed, facilitating operation at relatively high load and/or high engine speeds. Valve 64 may be actuated from a closed position to an at least partially open position by actuator 72, e.g., a pneumatic actuator as illustrated in FIG. 2 and as described above.

In the exemplary pneumatic configuration of actuator 72, pressure line 74 is in fluid communication with gas output from compressor 32. For example, pressure line 74 may be connected to compressor outlet 70 such that, when the pressure in compressor outlet 70 reaches the predetermined opening pressure, the pressure of air compressed by compressor wheel 68 may act against a spring member of actuator 72, moving valve 64 from the fully-closed position. Actuator 72 may be configured to gradually open valve 64 when the pressure of gas reaches the predetermined opening pressure. In this exemplary configuration, actuator 72 may be configured to fully open when the pressure reaches a predetermined maximum pressure, which is larger than the predetermined threshold opening at which valve 64 begins to open. Thus, the flow of air 46 and fuel 48 through passage 54 may gradually increase according to a corresponding increase in the speed or output (e.g., torque) of engine 14. In other embodiments, such as an embodiment where actuator 72 is electronically-controlled (e.g., via an engine control module) or when actuator 72 includes a spring member having an appropriate biasing force, actuator 72 may instead be configured to fully open valve 64 when the pressure of gas output from compressor 32 reaches the predetermined threshold pressure.

Step 308 may include supplying intake air 46 and fuel 48 to internal combustion engine 14. As shown in FIG. 2, the intake air 46 and gaseous fuel 48 received by passages 52 and 54 may exit conduit 22 and enter compressor 32, either directly (not shown) or through connection passage 24. After being compressed, air and fuel may enter intake manifold 36, where the compressed air and fuel is routed to cylinders 16 of engine 14. This fuel may be combusted in cylinders 16, creating exhaust gas that exits system 10, as described above.

In the disclosed method and system, a bypass passage 54 may facilitate the supply of sufficient quantities of air and fuel under varying engine conditions, and in particular, under conditions where a higher air flow rate is desirable. For example, a bypass passage 54 may be configured to receive air and gaseous fuel when relatively high airflow is desired. A bypass passage 54 may provide a path having reduced restriction, as compared to a venturi passage 52, to the flow of air during such high flow-rate conditions, allowing air and fuel to be supplied to an inlet of a compressor 32 at a suitable pressure. A bypass passage 54 may be closed under some conditions, such as low-load conditions where desired flow of air is relatively low. Thus, the system may be configured to draw in a sufficient quantity of fuel for expected conditions of an engine system, including both low-load conditions and high-load conditions. The disclosed method and system may further facilitate a reduction in compressor rotation for a particular engine condition, reducing demands on the engine system.

It will be apparent to those skilled in the art that various modifications and variations can be made to the disclosed method and system without departing from the scope of the disclosure. Other embodiments of the method and system will be apparent to those skilled in the art from consideration of the specification and practice of the systems disclosed herein. It is intended that the specification and examples be considered as exemplary only, with a true scope of the disclosure being indicated by the following claims and their equivalents.

What is claimed is:

1. A system for introducing a gaseous fuel to an internal combustion engine, the system comprising:
    a fuel storage device;
    a compressor; and
    an air and fuel conduit in fluid communication with the fuel storage device and with the compressor, the air and fuel conduit including:
        a first passage; and
        a second passage that includes a first portion and a second portion, the second portion being a venturi portion that includes an inlet opening configured to receive fuel, the venturi portion being configured to receive an entirety of the air that passes through the second passage, the inlet opening being provided on an inner surface of the second passage, the second passage being fluidly connected to the compressor in parallel with the first passage wherein the air and fuel conduit is connected upstream of the compressor.

2. The system of claim 1, wherein the fuel storage device is configured to supply gaseous fuel to the first passage and to the second passage.

3. The system of claim 2, wherein the first passage includes an additional inlet opening configured to receive the gaseous fuel.

4. The system of claim 1, wherein the first passage includes a valve configured to selectively permit and prohibit a flow of air and fuel through the first passage.

5. The system of claim 4, further comprising an actuator configured to change a position of the valve in response to a change in a pressure of gas compressed by the compressor.

6. The system of claim 1, further comprising a mixing passage connected between the air and fuel conduit and the compressor.

7. The system of claim 1, further comprising a storage device storing natural gas, the storage device being in fluid communication with the air and fuel conduit.

8. A fuel system, comprising:
    a fuel storage device;
    a first passage including:
        a first air inlet configured to receive intake air;
        a first fuel inlet in fluid communication with the fuel storage device and configured to receive gaseous fuel downstream of the first air inlet; and
        a valve configured to open and close the first passage; and
    an actuator configured to change a position of the valve in response to a change in a pressure of gas compressed by a compressor;
    a second passage connected in parallel with the first passage, the first passage and the second passage being upstream of the compressor, the second passage including:
        a second air inlet configured to receive intake air; and
        a second fuel inlet configured to receive gaseous fuel downstream of the second air inlet.

9. The fuel system of claim 8, wherein the actuator is configured to cause the valve to open, from a closed position, when a pressure of gas output from the compressor is at least a minimum opening pressure.

10. The fuel system of claim 9, wherein the actuator is a pneumatic actuator.

11. The fuel system of claim 9, wherein the second passage is permanently open to a flow of air.

12. The fuel system of claim 9, wherein the valve is configured to fully open when the pressure of gas output from the compressor is at least the minimum opening pressure.

13. The fuel system of claim 8, wherein the valve is disposed downstream of the first air inlet and downstream of the first fuel inlet.

14. A method for supplying fuel and air to an internal combustion engine, the method comprising:
    controlling a flow of intake air and fuel through a first passage of an air and fuel conduit;
    receiving intake air and fuel with a second passage of the air and fuel conduit, the second passage being connected in parallel with the first passage;
    opening the first passage when a pressure of gas from a compressor downstream of the first passage and the second passage of the air and fuel conduit reaches an opening pressure to permit a flow of the intake air and fuel; and supplying the intake air and fuel from the first passage and from the second passage to the internal combustion engine.

15. The method of claim 14, wherein controlling the flow of intake air and fuel through the first passage includes blocking the flow of the intake air and fuel through the first passage with a valve positioned within the first passage.

16. The method of claim 14, wherein the fuel is supplied as a gaseous fuel.

17. The method of claim 16, wherein the gaseous fuel includes natural gas.

18. The system of claim 1, wherein the inlet opening is disposed at a narrowest portion of the venturi portion.

19. The system of claim 1, wherein the first passage has a substantially constant diameter.

\* \* \* \* \*